United States Patent

Marold et al.

[11] 3,930,323
[45] Jan. 6, 1976

[54] CHAIN TENSIONING MECHANISM FOR SCRAPER ELEVATOR DEVICE

[75] Inventors: Frank C. Marold, Willowick; James J. Cinadr, Parma, both of Ohio

[73] Assignee: General Motors Corporation, Detroit, Mich.

[22] Filed: Nov. 29, 1974

[21] Appl. No.: 527,956

[52] U.S. Cl.................. 37/8; 198/208; 74/242.1 R
[51] Int. Cl.² ............... B60P 1/36; B65G 23/44
[58] Field of Search ....... 198/7 R, 11, 36, 174, 208; 104/117, 196; 74/242.11 D, 242.1 R, 242.1 TA; 37/8

[56] References Cited
UNITED STATES PATENTS

| | | | |
|---|---|---|---|
| 372,157 | 10/1887 | Lawton | 198/208 |
| 3,129,605 | 4/1964 | Bonnell, Jr. et al. | 104/196 |
| 3,161,280 | 12/1964 | Creighton et al. | 198/208 |
| 3,807,549 | 4/1974 | Cowdery et al. | 198/208 |

Primary Examiner—Evon C. Blunk
Assistant Examiner—Robert Saifer
Attorney, Agent, or Firm—Edward J. Biskup

[57] ABSTRACT

A tensioning mechanism for the chain of a scraper elevator device that includes a pair of pivotally interconnected lever arms which support guide rollers. The lever arms are movable by an adjuster link in a scissors fashion for maintaining tension on the chain.

2 Claims, 3 Drawing Figures

CHAIN TENSIONING MECHANISM FOR SCRAPER ELEVATOR DEVICE

This invention concerns an elevator device of the type used with self-loading rubber-tired scrapers and more particularly a tensioning mechanism for the elevator device that includes a pair of guide rollers which are movable towards each other for increasing the tension of the elevator chain.

The present invention is incorporated with a self-loading scraper having a tractor connected by a pull yoke to a trailing scraper bowl. As is conventional, the scraper bowl has an open end which is defined by a pair of laterally spaced side walls and a transverse cutting blade extending between the side walls. An elevator device is located between and carried by the side walls of the scraper bowl and includes a frame the upper end of which is provided with a drive sprocket wheel while the lower end supports an idler sprocket wheel. An endless chain having a plurality of transverse flight members is entrained about the upper and lower sprocket wheels and a chain tensioning mechanism is carried by the frame. In the preferred form, the chain tensioning mechanism consists of a pair of guide rollers which engage the chain at spaced points located outboard from an axis that passes through the centers of the upper and lower sprocket wheels. The guide rollers are rotatably supported by a pair of pivotally interconnected arms which are movable in a scissors fashion through an adjuster link which extends between and is connected to the outer ends of the arms. By varying the length of the adjuster link, the guide rollers can be moved towards each other to thereby increase the tension of the chain.

The objects of the present invention are to provide an improved scraper elevator device having guide rollers supported in a scissors fashion for tensioning the elevator chain; to provide an improved chain tensioning mechanism for a scraper elevator that has a pair of guide rollers that are supported by levers which are adjustable so the guide rollers move towards each other for increasing the tension of the chain; to provide an improved chain tensioning mechanism for a scraper elevator that supports a pair of guide rollers that are adjustably movable through an adjuster link member for increasing the tension of the chain; and to provide an improved elevator device for a scraper bowl that includes a pair of pivotally interconnected lever arms which support guide rollers and are movable relative to each other for adjusting the positions of the guide rollers and thereby tensioning the elevator chain.

Other objects and advantages of the invention will be apparent from the following detailed description when read with reference to the drawings in which.

Figure 1:
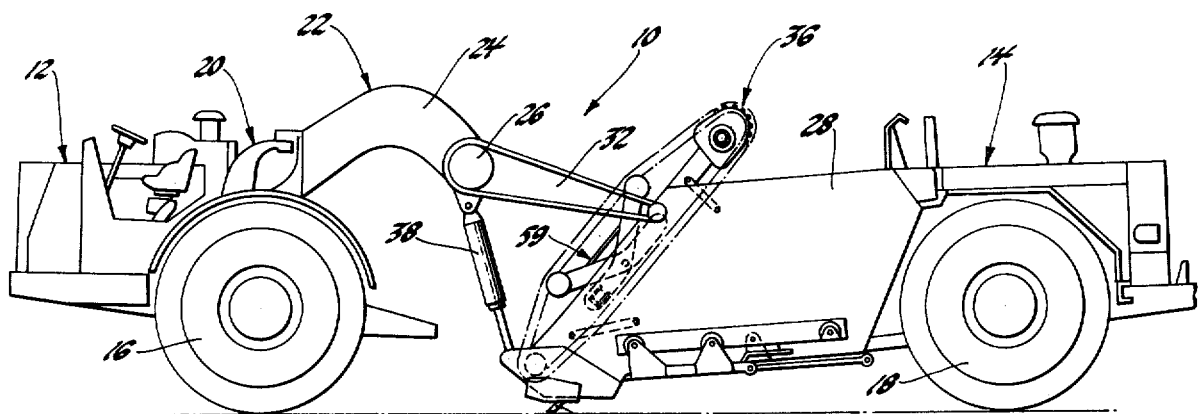
FIG. 1 shows a rubber-tired overhung scraper having an elevator device incorporating a chain tensioning mechanism made according to the invention.

Referring to the drawings and more particularly FIG. 1 thereof, an elevating scraper 10 is shown having the usual overhung tractor 12 and a trailing scraper bowl 14 which are respectively supported in the usual manner by rubber-tires 16 and 18. The tractor 12 is connected through a universal coupling 20 to a pull yoke 22 including a goose neck 24 which extends rearwardly for rigid connection with a transverse torque tube 26. As is conventional, the opposite ends of the torque tube 26 are provided with laterally spaced identical pull arms the rear ends of which are connected by transversely aligned pivot connections to the side walls 28 and 30 of the scraper bowl 14. Only one of the pull arms is shown and is identified by reference numeral 32. The front open end of the scraper bowl 14 is defined by the side walls 28 and 30 and a transversely extending cutting blade 34. An elevator device 36 is supported in the front open end of the scraper bowl and serves as a means for assisting loading of cut material into the scraper bowl 14. As is also conventional with elevating scrapers of this type, the front end of the scraper bowl 14 is supported by a pair of double-acting hydraulic bowl cylinders one of which only is shown and identified by reference numeral 38. Each of the bowl cylinders has the upper end thereof pivotally mounted to the torque tube 26 adjacent the outer end thereof while the lower end of each bowl cylinder 38 is pivotally connected to the lower forward end of the scraper bowl 14. The bowl cylinders 38 serve to move the scraper bowl 14 between a raised carry-position and a lowered dig-position.

Figure 2:
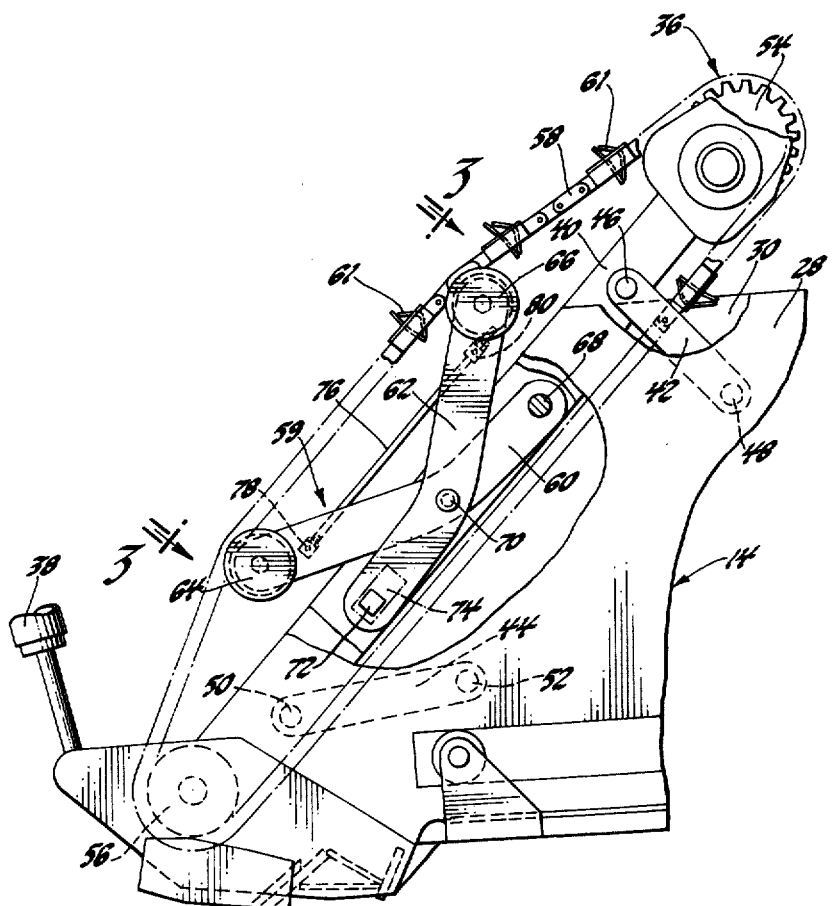
FIG. 2 is an enlarged view of the elevator device showing the details of the construction of the chain tensioning mechanism.
Figure 3:
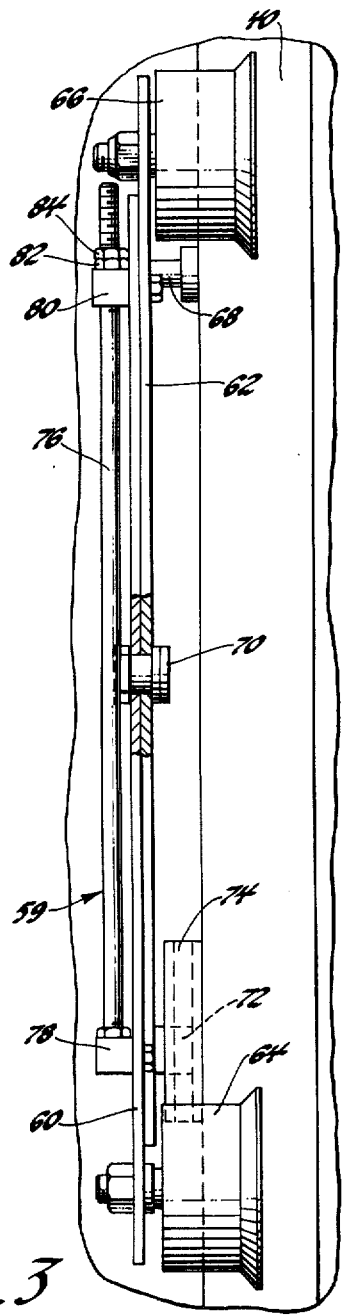
FIG. 3 is a further enlarged view of the chain tensioning mechanism taken on line 3—3 of FIG. 2.

As seen in FIG. 2, the elevator device 36 includes a support frame 40 each side of which is supported for floating movement by a mounting assembly consisting of upper and lower link members 42 and 44, respectively. The upper link member 42 has one end thereof connected by a pivotal connection 46 to the upper portion of the support frame 40 while the other end is connected by a pivotal connection 48 to the associated side wall of the scraper bowl 14. Similarly, the link member 44 has one end connected by a pivotal connection 50 to the lower portion of the support frame 40 while the other end is connected by a pivotal connection 52 to the associated side wall. Although not shown, it will be understood that appropriate stop means attached to each side wall are provided for cooperation with the lower link member 44 so as to maintain the lower flight members of the elevator device spaced a predetermined distance from the cutting blade. A suspension arrangement of this type for an elevator device is quite common for allowing the lower end of the elevator device 36 to move upwardly in the event large boulders or other obstructions are encountered while limiting movement of the lower end in a downward direction so as to realize a predetermined spacing between the flight members and the cutting blade.

As is typical with elevator devices, the support frame 40 is provided with a drive sprocket wheel 54 at its upper end and an idler sprocket wheel 56 at its lower end with an endless chain 58 entrained about the sprocket wheels. In addition, a plurality of transversely extending flight members 61 are rigidly secured to the chain 58 at equally spaced points therealong and serve to move cut material from the cutting blade area when the scraper is performing a digging operation.

A chain tensioning mechanism 59 made in accordance with the invention is carried by the support frame 40 and comprises a pair of lever arms 60 and 62 which respectively rotatably carry guide rollers 64 and 66 at the outer ends thereof. The lever arm 60 has its inner end connected to the support frame 40 by a pivotal connection 68 and has an intermediate portion thereof connected to an intermediate portion of the lever arm 62 by a pivotal connection 70. The inner end of the lever arm 62 is pivotally connected to a block member 72 which is slidably located within a guide channel 74 secured to the support frame 40.

An adjuster link extends between the outer ends of the lever arms 60 and 62 and includes a cylindrical rod 76 having one end rigidly secured to a square lug 78 carried by the outer end of the lever arm for pivotal movement about a horizontal axis. The other end of the rod 76 has threads formed thereon and extends through an enlarged opening in a square lug 80 carried by the outer end of lever arm 62 for pivotal movement about a horizontal axis. It will be noted that the threaded end of the rod 76 has a pair of nuts 82 and 84 threaded thereon. The nut 82 serves to adjust the operating length of the rod and the nut 84 functions as a lock nut.

From the above description, it should be apparent that when it is desired to increase the tension of the chain 58, this can be accomplished by first loosening the nut 84 of the tensioning mechanism 59 followed by tightening of the nut 82 so as to draw the threaded end of the rod 76 further beyond the lug 80. This causes the outer ends of the lever arms 60 and 62 and, accordingly, the guide rollers 64 and 66 to be moved towards each other. During such movement, the lever arm 60 will pivot about the pivotal connection 68 in a clockwise direction as seen in FIG. 2. This pivotal movement of the lever arm 60 will tend to cause the pivotal connection 70 to move slightly outwardly relative to the support frame 40 with some movement occurring between the block 72 and the guide way 74. Thus, in this manner, the tension of the chain 58 is increased.

Various changes and modifications can be made in this construction without departing from the spirit of the invention. Such changes and modifications are contemplated by the inventors and they do not wish to be limited except by the scope of the appended claims.

We claim:

1. In combination with a self-loading scraper having a tractor connected by a pull yoke to a trailing scraper bowl, said scraper bowl having an open end defined by a pair of laterally spaced side walls and a transverse cutting blade extending between the side walls, an elevator device located between and carried by the side walls of said scraper bowl, said elevator device comprising a frame, a drive sprocket wheel rotatably supported at the upper end of said frame, an idler sprocket wheel rotatably supported at the lower end of said frame, an endless chain having a plurality of transverse flight members connected thereto and being entrained about said drive sprocket wheel and idler sprocket wheel, a mechanism carried by said frame for tensioning said chain and having a pair of guide rollers engaging said endless chain, said mechanism being located between said drive sprocket and idler sprocket wheel and including a pair of arms pivotally interconnected in a scissors fashion, each of said arms having an inner end adjacent said frame and an outer end adjacent said chain, said pair of guide rollers being rotatably supported by the outer ends of said pair of arms, means pivotally connecting the inner end of one of said pair of arms to said frame, means supporting the inner end of the other of said pair of arms on said frame for sliding movement, and adjusting means extending between and interconnecting said arms for moving said guide rollers towards each other so as to increase the tension of said chain.

2. In combination with a self-loading scraper having a tractor connected by a pull yoke to a trailing scraper bowl, said scraper bowl having an open end defined by a pair of laterally spaced side walls and a transverse cutting blade extending between the side walls, an elevator device located between and carried by the side walls of said scraper bowl, said elevator device comprising a frame, a drive sprocket wheel rotatably supported at the upper end of said frame, an idler sprocket wheel rotatably supported at the lower end of said frame, an endless chain having a plurality of transverse flight members connected thereto and being entrained about said drive sprocket wheel and idler sprocket wheel, a mechanism carried by said frame for tensioning said chain and having a pair of guide rollers engaging said endless chain, said mechanism being located midway between said drive sprocket and idler sprocket wheel and including a pair of arms pivotally interconnected in a scissors fashion, each of said arms having an inner end adjacent said frame and an outer end adjacent said chain, said pair of guide rollers being rotatably supported by the outer ends of said pair of arms so as to position the centers of said pair of guide rollers along a line that is substantially parallel to a line passing through the centers of said drive sprocket wheel and idler sprocket wheel, means pivotally connecting the inner end of one of said pair of arms to said frame, a guideway supporting the inner end of the other of said pair of arms on said frame for sliding movement along an axis parallel to the longitudinal axis of said frame, and a manually adjustable link in the form of a threaded rod extending between and interconnecting the outer ends of said arms for moving said guide rollers towards each other so as to increase the tension of said chain.

* * * * *